United States Patent
Loncar et al.

(12) 
(10) Patent No.: US 6,287,013 B1
(45) Date of Patent: Sep. 11, 2001

(54) BALL BEARING

(75) Inventors: Peter Loncar, Herzogenaurach; Reinhold Nutzel, Adelsdorf, both of (DE)

(73) Assignee: Ina Walzlager Schaeffler (DE)

( * ) Notice: Subject to any disclaimer, the term of this patent is extended or adjusted under 35 U.S.C. 154(b) by 0 days.

(21) Appl. No.: 09/516,838

(22) Filed: Mar. 2, 2000

(30) Foreign Application Priority Data

Mar. 24, 1999 (DE) ................................................ 199 13 211

(51) Int. Cl.[7] ........................................................ F16C 43/04
(52) U.S. Cl. ............................ 384/539; 384/510; 384/537
(58) Field of Search .................................. 384/490, 510, 384/513, 515, 537, 538, 539, 609, 611, 615, 617

(56) References Cited

U.S. PATENT DOCUMENTS

| | | | |
|---|---|---|---|
| 878,652 | * | 2/1908 | Matthews ............................. 384/510 |
| 998,099 | * | 7/1911 | Knipe .................................. 384/510 |
| 3,230,022 | * | 1/1966 | Znamirowski ...................... 384/515 |
| 4,696,588 | * | 9/1987 | Tanaka et al. ...................... 384/615 |
| 4,765,762 | * | 8/1988 | Rozentals ........................... 384/539 |

FOREIGN PATENT DOCUMENTS

| | | |
|---|---|---|
| 1254408 | 6/1957 | (DE) . |
| 1525134 | 6/1969 | (DE) . |
| 7013862 | 7/1970 | (DE) . |
| 6906278 | 3/1971 | (DE) . |
| 7325080 | 10/1973 | (DE) . |
| 3808556 | 9/1989 | (DE) . |
| 3914175 | 11/1989 | (DE) . |
| 3914289 | 10/1990 | (DE) . |

* cited by examiner

*Primary Examiner*—Thomas R. Hannon
(74) *Attorney, Agent, or Firm*—Bierman, Muserlian and Lucas

(57) ABSTRACT

A chiplessly made angular contact bearing comprising an outer ring (1) and an inner ring (5) is configured as a self-retaining unit by the fact that the inner ring (5) comprises uniformly spaced resilient retaining tabs (10) which, as viewed in longitudinal cross-section, comprise two sections (11, 12) that are disposed angularly relative to each other and separated by a vertex (13), the diameter of the retaining tabs (10) is largest at the vertex (13) and the diameter of the axially outer section (11) of the retaining tabs (10) is smaller than the inner diameter of the outer ring (1).

6 Claims, 3 Drawing Sheets

BALL BEARING

FIELD OF THE INVENTION

The invention concerns a chiplessly shaped ball bearing, particularly an angular contact ball bearing for a steering shaft of an automotive vehicle, comprising an outer ring, an inner ring and bearing balls which are in rolling contact with raceways of the outer and the inner ring, a falling-apart of the bearing being prevented by a radially outward oriented projection of the inner ring that overlaps an inner diameter of the outer ring.

BACKGROUND OF THE INVENTION

Such chiplessly shaped angular contact ball bearings that can take up axial forces only in one direction and therefore have to be positioned against a second bearing are preferentially used as steering bearings because they have a very small moment of friction, a relatively high rigidity and are simple to mount and economic at the same time.

These angular contact ball bearings made up of the two bearing rings have to be retained inseparably together for transport and for assembly at the customer's site. In a solution offered in the document DE-GM 69 06 278, the inner bearing ring comprises an extended region that is folded over around the outer bearing ring in radial direction. This folding-over can be achieved, for example, by rolling.

A drawback of this is that the bearing can only be hardened in the region of the raceways, because, otherwise, it is not possible to fold over the extended inner ring. However, a partial hardening of a bearing is always more complicated than a hardening of the entire bearing.

OBJECTS OF THE INVENTION

It is an object of the invention to create a safety device for a chiplessly made ball bearing which renders the ball bearing inseparable without disadvantageously influencing the cost of manufacturing and assembly of the bearing.

This and other objects and advantages of the invention will become obvious from the following detailed description.

SUMMARY OF THE INVENTION

The invention achieves the above objects by the fact that the projection is configured in the form of circumferentially uniformly spaced resilient retaining tabs which, as viewed in longitudinal cross-section, comprise an axially outer section and an axially inner section, which axially outer and inner sections are disposed angularly relative to each other and separated by a vertex, a diameter of the retaining tabs is largest at the vertex, and a diameter of the axially outer section of the retaining tabs is smaller than an inner diameter of the outer ring.

These inventive measures enable, in a simple manner, a reliable coherence of the ball bearing as well as a simple assembly because the axially outer section of the retaining tabs assures that the outer ring is lodged and guided during assembly. When the two bearing rings are slipped axially onto each other, the resilient retaining tabs of the inner ring are pressed radially inwards by the outer ring and snap into their original position when the vertex has passed through so that the bearing is then held reliably together. The overlap of the retaining tabs can be chosen to be large enough to prevent a falling-apart of the bearing during transportation with certainty. An excessively large overlap as encountered in the prior art which can result in a breaking-off of conventional retaining tabs does not present any drawbacks in the present invention because the retaining tabs of the invention are very flexible.

According to further features of the invention, the axially inner and outer sections of the retaining tabs may be oppositely inclined to form a roof shape or they may have a curved configuration. These are equal solutions and the choice depends solely on the available manufacturing technology.

According to another feature of the invention, the bearing balls are arranged in a cage. In contrast to a full-complement set of balls, the use of a cage reduces fluctuations in the moment of friction.

According to a final feature of the invention, the ball bearing is subjected to a heat treatment to improve its mechanical properties. The individual components of the bearing may be heat-treated prior to the assembly of the bearing which means that snapping is effected in the hardened state. However, the opposite procedure is just as feasible, i.e. the bearing is snapped together in the unhardened state and then hardened as a whole to achieve an improvement of its mechanical properties.

The invention will now be described in further detail with reference to an example of embodiment represented in the appended drawings.

DETAILED DESCRIPTION OF THE DRAWINGS

Figure 1:
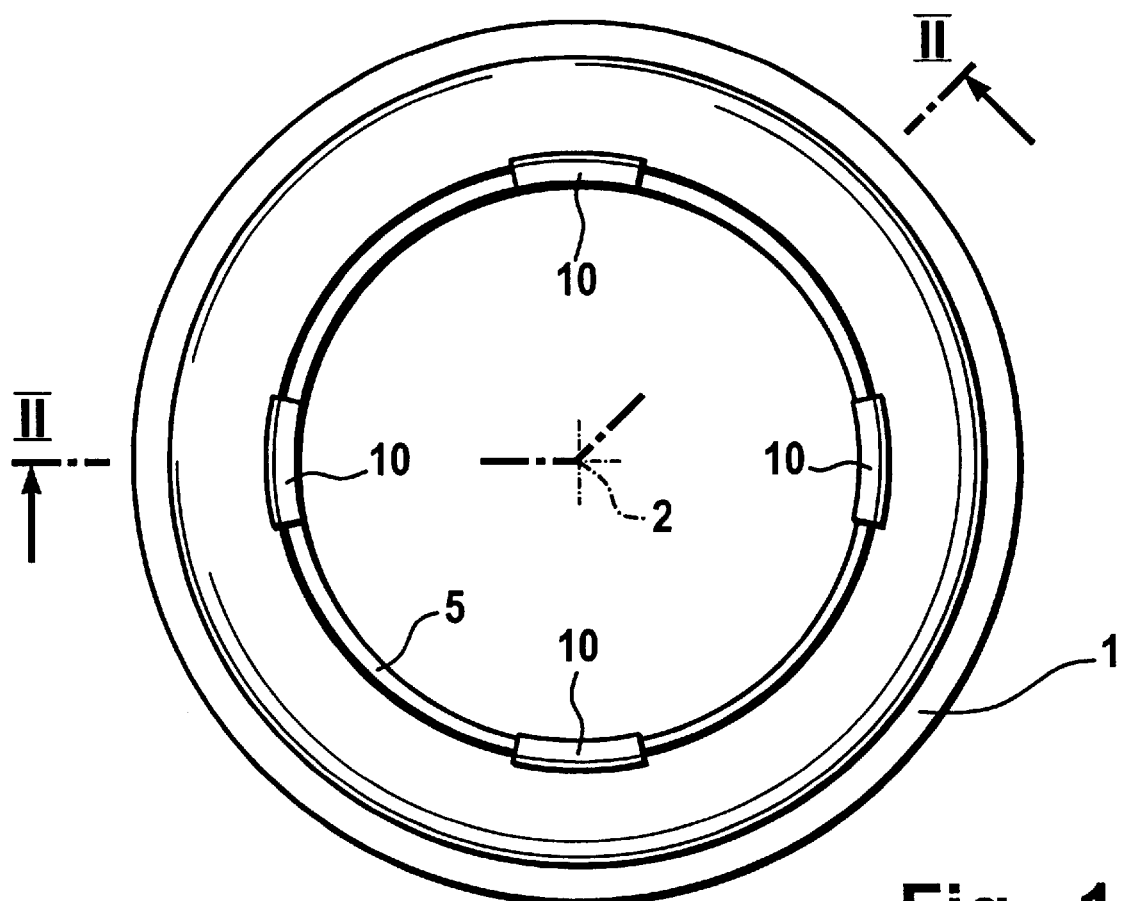
FIG. 1 is a top view of a ball bearing of the invention.
Figure 2:
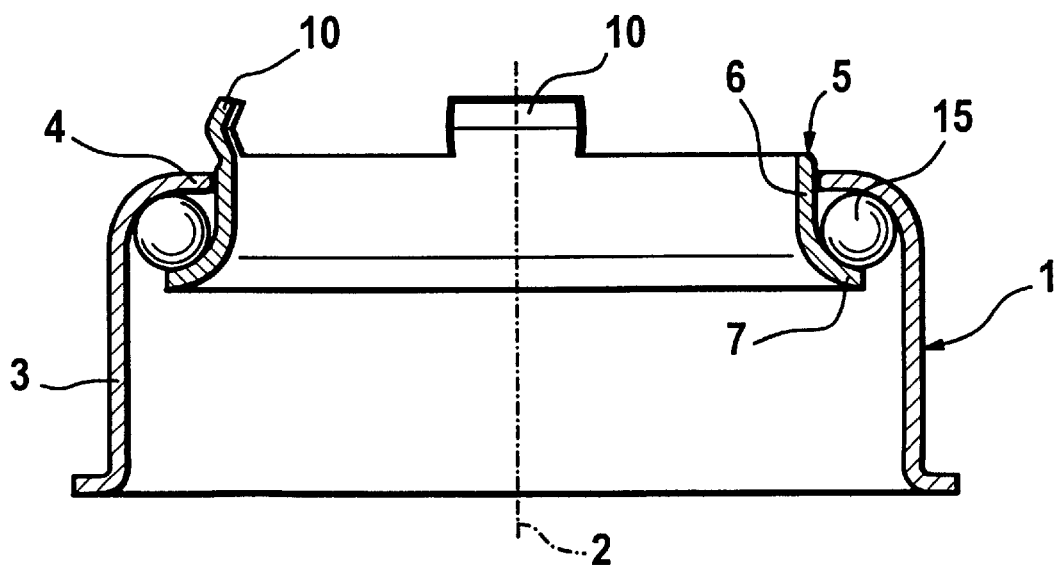
FIG. 2 is a longitudinal cross-section through the ball bearing of FIG. 1 taken along line II—II of FIG. 1.

The angular contact bearing represented in FIGS. 1 to 6 comprises a chiplessly drawn outer bearing ring 1 which has an axis of rotation 2 and one section 3 extending axially and one section 4 extending radially of the axis of rotation 2. The associated inner bearing ring 5 is likewise made without chip removal and also comprises an axially extending section 6 and a radially extending section 7. Bearing balls 15 are arranged between the two bearing rings 1 and 5 in rolling contact with associated raceways 8 and 9 formed on the axially extending sections 3 and 6 and the radially extending sections 4 and 7.

Figure 6:
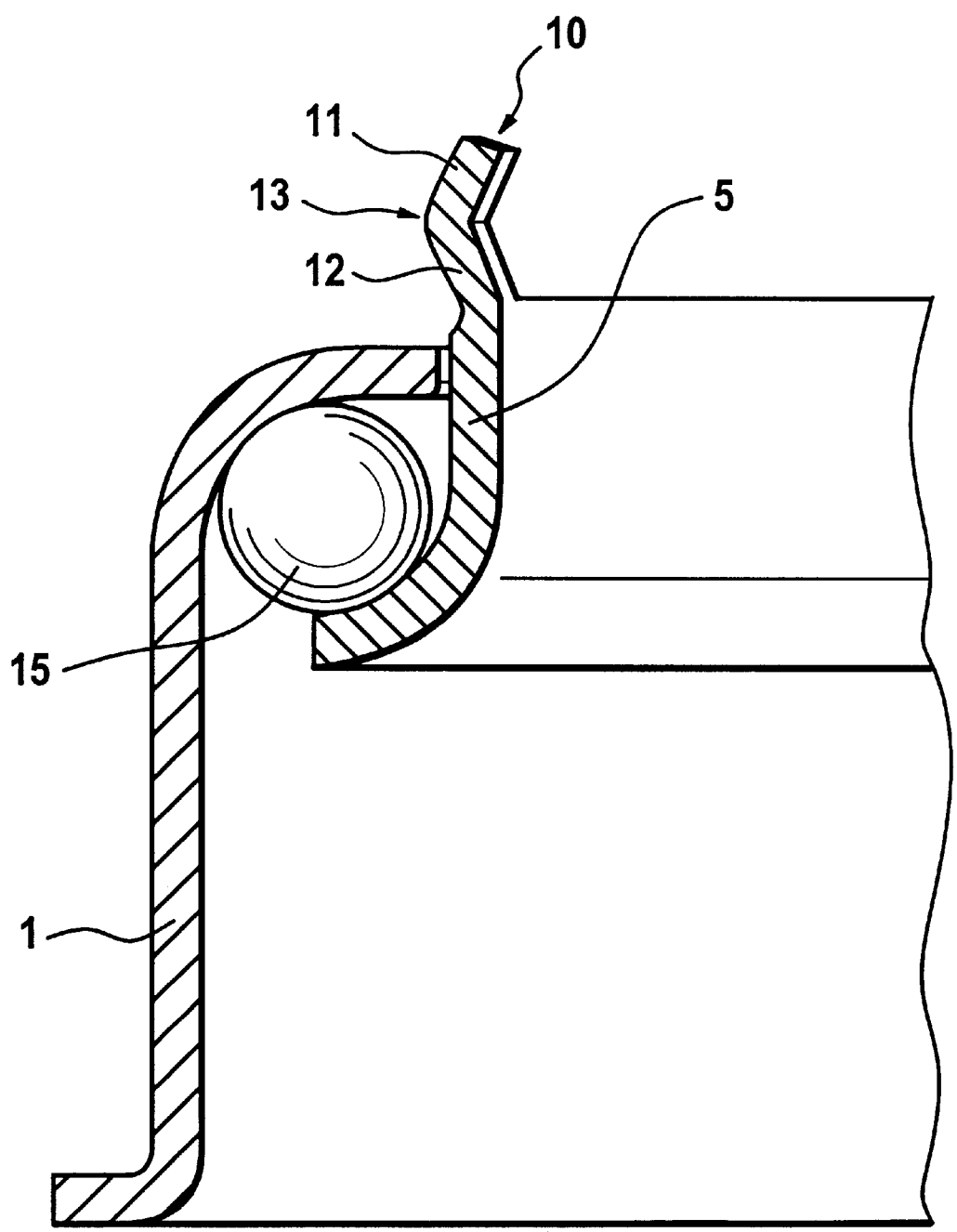
FIG. 6 is an enlarged representation of a detail of the bearing of the invention.

As can best be seen in FIG. 6, the inner ring 5 comprises resilient retaining tabs 10 uniformly spaced around its periphery. These tabs 10 comprise an axially outer section 11 and an axially inner section 12, which sections extend from a vertex 13 at a slant in opposite directions. In this embodiment, the resilient tabs 10 are inclined so as to form a roof shape.

Figure 3:
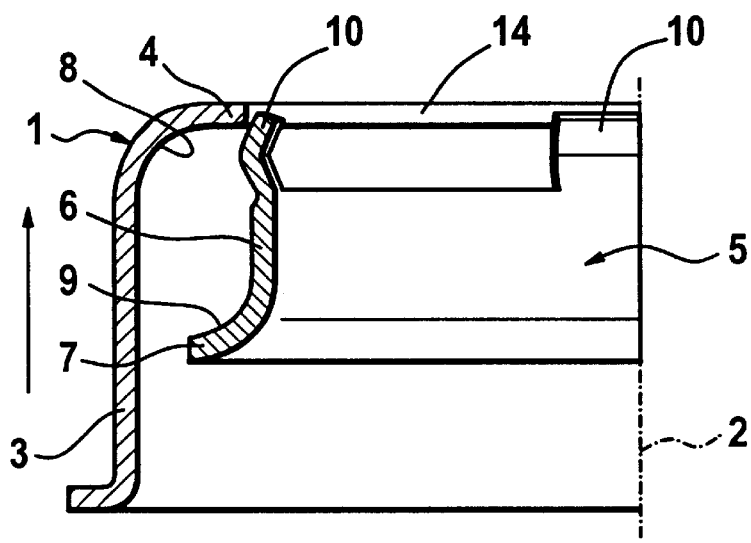
FIG. 3 shows a first step in the assembly of the bearing of the invention.
Figure 4:
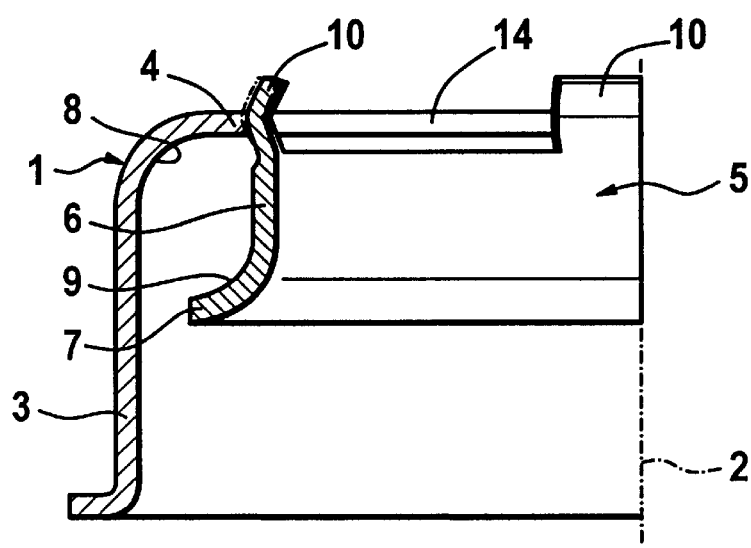
FIG. 4 shows a second step in the assembly of the bearing of the invention.
Figure 5:
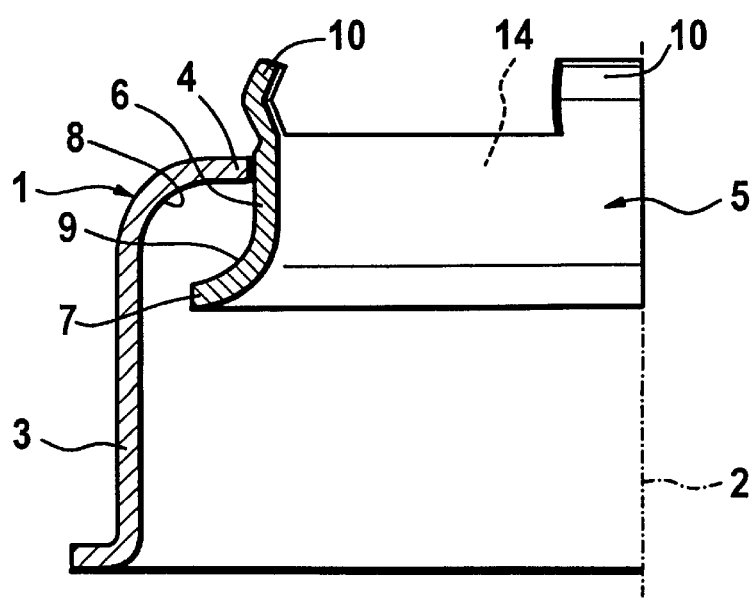
FIG. 5 shows a third step in the assembly of the bearing of the invention.

FIGS. 3, 4 and 5 show the assembling of the steering bearing into a self-retaining unit. In a first step, the inner bearing ring 5 is pushed in upwards in the direction of the arrow through an opening 14 of the outer bearing ring 1. The clear width of the opening 14 is dimensioned so as to concentrically surround the axially outer section 11 of the retaining tab 10. When the inner ring 5 is pushed further into the outer ring 1, the section 11 of the retaining tab 10 is pressed radially inwards by the opening 14, i.e. the opening 14 slides with its inner peripheral surface on the section 11. As can be seen in FIG. 4, the largest inward displacement of the retaining tab 10 occurs when the inner peripheral surface of the opening 14 is situated on the vertex 13 of the retaining tab 10. As shown in FIG. 5, when the inner ring 5 is pushed further into the outer ring 1, the retaining tab 10 springs back radially into its original position after the vertex 13 has passed through the opening 14. In this way, a self-retaining unit comprising the outer ring 1, the inner ring 5 and the ball crown ring 15 is created. The advantage of this solution resides particularly in the fact that the radial overlap of the retaining tabs 10 can be pre-defined so as to eliminate both the danger of a breaking of the retaining tabs 10 due to a too large overlap and the danger of a falling-apart of the bearing due to a too small overlap.

What is claimed is:

1. A chiplessly shaped ball bearing comprising an outer ring, an inner ring and bearing balls which are in rolling contact with raceways of the outer and the inner ring, a falling-apart of the bearing being prevented by a radially outward oriented projection of the inner ring that overlaps an inner diameter of the outer ring, wherein the projection is configured in the form of circumferentially uniformly spaced resilient retaining tabs which, as viewed in longitudinal cross-section, comprise an axially outer section and an axially inner section, said axially outer and inner sections being disposed angularly relative to each other and separated by a vertex, and wherein a diameter of the retaining tabs is largest at the vertex and a diameter of the axially outer section of the retaining tabs is smaller than an inner diameter of the outer ring.

2. A chiplessly shaped ball bearing of claim 1 configured as an angular contact ball bearing for a steering shaft of an automotive vehicle.

3. A chiplessly shaped ball bearing of claim 2 wherein the axially inner and outer sections of the retaining tabs are oppositely inclined to form a roof shape.

4. A chiplessly shaped ball bearing of claim 2 wherein the axially inner and outer sections have a curved configuration.

5. A chiplessly shaped ball bearing of claim 2 wherein the bearing balls are arranged in a cage.

6. A chiplessly shaped ball bearing of claim 2 wherein the ball bearing is heat-treated.

* * * * *